United States Patent [19]

Fong

[11] Patent Number: 4,658,087

[45] Date of Patent: Apr. 14, 1987

[54] PHOTOELECTRODES FOR PHOTOELECTROCHEMICAL CELL DEVICES

[75] Inventor: Gerald D. Fong, Catlin, N.Y.

[73] Assignee: Corning Glass Works, Corning, N.Y.

[21] Appl. No.: 831,271

[22] Filed: Feb. 20, 1986

Related U.S. Application Data

[63] Continuation-in-part of Ser. No. 633,660, Jul. 23, 1984, abandoned.

[51] Int. Cl.[4] .............................................. E03B 11/00
[52] U.S. Cl. .................................... 136/264; 350/356; 350/357; 252/501.1; 252/512; 136/265
[58] Field of Search ............................ 252/501.1, 512; 501/1 L, 21, 40; 350/356, 357; 136/264, 265, 258; 633/660

[56] References Cited

U.S. PATENT DOCUMENTS 3,841,739 10/1974 Asahara et al. ..................... 350/230

Primary Examiner—Josephine L. Barr
Attorney, Agent, or Firm—C. S. Janes, Jr.

[57] ABSTRACT

This invention is concerned with producing glasses in the As-Se-Cu field exhibiting properties rendering them eminently suitable for photoelectrodes of photoelectrochemical devices. The glasses consist essentially of compositions within the region ABCDEA of FIG. 1.

6 Claims, 11 Drawing Figures

| SYMBOL | $\phi_{oc}$ RANGE |
|---|---|
| ● | <5 mV |
| ◉ | 5–30 mV |
| ○ | >30 mV |
| △ | CRYSTALLIZED |

| SYMBOL | $\phi_{oc}$ RANGE |
|---|---|
| ● | <5 mV |
| ⊖ | 5–30 mV |
| ○ | >30 mV |
| △ | CRYSTALLIZED |

PHOTOELECTRODES FOR PHOTOELECTROCHEMICAL CELL DEVICES

This application is a continuation-in-part application of Ser. No. 633,660, filed July 23, 1984, now abandoned.

BACKGROUND OF THE DISCLOSURE

A photoelectrochemical cell device consists essentially of an electrolyte containing appropriately chosen redox couples in contact with a working electrode voltage-biased with respect to a convenient reference electrode and in series with a counterelectrode, which, upon illuminating the working electrode with light of the proper wave lengths, converts the introduced redox couples to a higher energy state and creates an externally measureable current with net positive efficiency. Such a working electrode has been termed a photoelectrode.

The application of semiconductor materials for photoelectrochemical conversions has been studied at least since 1972 when it was first reported that water could be split into hydrogen and oxygen in the presence of illuminated, doped $TiO_2$ crystals [K. Honda and A. Fujishima, *Nature*, 238, 38 (1972)]. Further research has focussed predominantly on crystalline systems; e.g., c-Si [D. Laser and A. J. Bard, *Journal of Physical Chemistry*, 80, 459 (1976)], c-GaAs [B. Miller, F. A. Thiel, and A. Heller, *Applied Physics Letters*, 38, 282 (1981)].

Little investigation has been reported on vitreous systems despite several inherent advantages possessed by glasses, viz., readily adjustable compositions, easy formability, and good strength. It is believed this lack of research has been due at least in part from traditional emphases on the simple, regular structures of crystals. Furthermore, a-Si was discovered to contain high densities of defect states associated with "dangling" bonds [A. E. Owen and W. E. Spear, *Physics and Chemistry of Glasses*, 17, (5) 174 (1976)]. Those defects were expected to lower photocarrier mobility by trapping, thereby reducing photocurrent density. That expectation has generally been extended to all glass compositions. Finally, doped crystalline semiconductors can conventionally exhibit electrical resistivities below 10 ohm-cm, whereas glasses commonly demonstrate electrical resistivities above $10^8$ ohm-cm.

Yet, the intrinsic advantages in formability, coupled with the absence of grain boundaries, have led to the extensive use of amorphous materials in electronic devices and in the production of high durability substrates. A recognition of those advantages resulted in research being initiated to determine their applicability as photoelectrodes in photoelectrochemical cell devices for solar energy conversion. A cornerstone of the investigation has been an endeavor to exploit physical property-glass composition interdependencies. Hence, it was perceived that multicomponent amorphous semiconductors could offer an adjustable spectrum of physical properties not fundamentally attainable from single element materials. Furthermore, laminates of varying composition, i.e., a graded gap junction, can be perceived which are capable of attaining efficiencies exceeding any value possible for a single gap junction.

GENERAL OUTLINE OF THE INVENTION

In conducting that research, I devised the following six basic criteria which a prospective glass candidate for these applications must satisfy:

(a) the composition system must form glasses over a relatively wide range of stoichiometries;

(b) the photoelectrochemical activity observed must be due to the glass composition; not to the presence of crystalline materials;

(c) the glasses must demonstrate open-circuit photopotentials of about 50–500 millivolts under white light, as exemplified by illumination from a 150 watt Xenon lamp;

(d) the glasses must manifest estimated band gaps within the range of about 0.8–2.5 electron volts (eV), with an optimal value being in the vicinity of 1.0 eV;

(e) the glass compositions must resist deterioration upon exposure to high photon fluxes and high voltages; that capability being determined through the requirement of low dark currents, i.e., about 1–40 microamperes $(\mu A)/cm^2$, by the observation of a lack of visible electrode discoloration, and by the stability of the output photocurrent over a period of time; and (f) the glasses must exhibit electrical resistivities lower than about $10^6$ ohm-cm.

An initial survey was undertaken of ternary chalcogenide glasses containing arsenic, selenium or tellurium, and a third element. That class of glasses possesses a number of desirable features. For example, the compositions are low melting and readily vaporizable, thereby making the preparation of thin films relatively easy. The glasses are often semiconducting and frequently display relatively low electrical resistivities. The compositions absorb strongly in the visible range of the radiation spectrum and are commonly resistant to chemical attack over the pH range of 0–13. Very importantly, the non-oxide glasses can permit adjustment of both the conduction and the valence band edge positions with modifications in composition. In contrast, oxide-containing semiconductors have valence edges which are fixed in value by their oxygen 2p orbitals. And unlike silicon, chalcogenide glasses exhibit no detrimental "dangling bond" gap states.

Therefore, the initial survey had four goals:

(1) to study a variety of ternary As-Se or Te-X systems to delineate a promising composition field for photoelectrochemical activity, wherein X may be selected from a number of elements;

(2) to demonstrate that the photoelectrochemical properties of the chosen ternary system can be adjusted through modifications in composition;

(3) to compare, where possible, the performance of a vitreous and crystalline body of identical composition to determine whether the glass manifests superior properties; and (4) to investigate gap state structure and discover the experimental factors which control the density and position of those states.

GENERAL DESCRIPTION OF THE INVENTION

Figure 1:
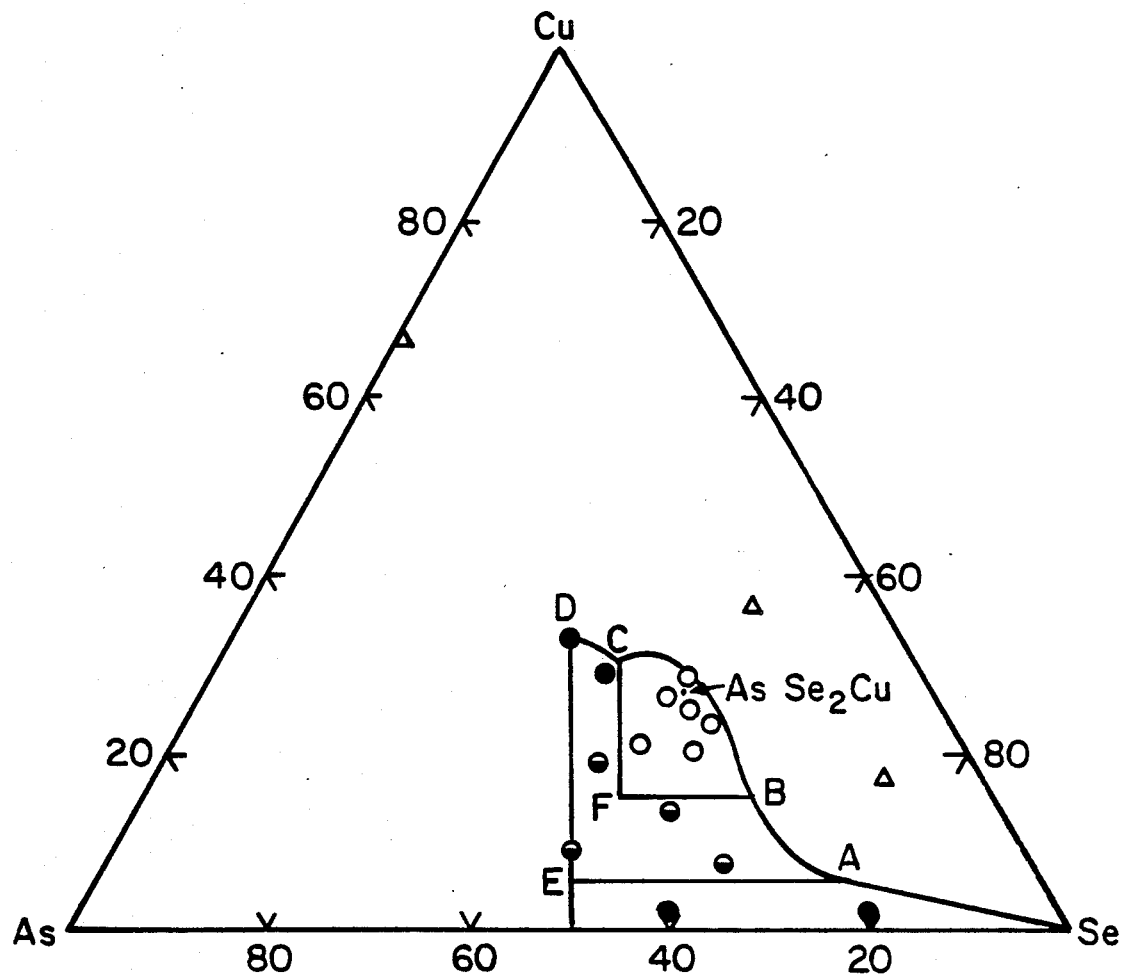
FIG. 1 comprises a ternary composition diagram, in atomic percent of the As-Se-Cu compositions operable in the present invention.

In carrying out that initial survey, the glass compositions were batched in vacuo in pre-dried silica tubes utilizing elements of 99.999% purity as starting materials. Both As and Se were separately pre-treated by heating at about 200°–250° C. in vacuo to vaporize off any oxide impurities. The tubes were flame sealed to form ampoules and the ampoules placed into a rocking furnace. The furnace was set into motion, heated to 225° C., maintained at that temperature for one hour, heated to 800°–900° C., and held thereat for 20–24 hours. The furnace motion was stopped, the ampoules removed therefrom, broken, and the molten, silvery masses were quenched in an ice bath. Table I reports compositions so prepared.

The resulting products were generally shiny and silver in appearance. Low resolution X-ray examination detected no evidence of crystallinity. Photoelectrodes were formed from thin flakes ($\sim$0.05–0.15 cm in thickness) with areas of 0.01–0.1 cm$^2$. Ohmic contact was obtained using vacuum deposited gold with silver paint and copper wire being utilized to make electrical contact to the gold.

Open circuit photopotentials ($\phi_{oc}$,mV) were measured for several compositions using air-saturated acetonitrile and filtered white light (150 watt Xenon arc lamp, wavelength $\gtrsim$280 nm, except where indicated otherwise). Those values are also recorded in Table I.

Table I lists glass compositions in terms of mole percent, both as calculated from the batch and as chemically analyzed in the final product. An empirical formula based upon chemically-analyzed, elemental ratios is also recited; the first element in each formula being deemed to have a stoichiometric coefficient of unity.

TABLE I

| Example | Batch | Analyzed | Formula | $\phi_{oc}$, mV |
|---|---|---|---|---|
| 1 | 40.1 As | 36.8 As | AsSe$_{0.6}$Te$_{1.0}$ | $\sim$10 |
|  | 20.0 Se | 21.3 Se |  |  |
|  | 39.9 Te | 41.9 Te |  |  |
| 2 | 40.3 As | 26.8 As | AsTe$_{1.8}$Cu$_{0.9}$ | $\sim$60 |
|  | 40.0 Te | 48.1 Te |  |  |
|  | 19.7 Cu | 25.1 Cu |  |  |
| 3 | 24.9 As | 47.3 As | AsTe$_{0.7}$Tl$_{0.4}$ | 3–50 |
|  | 50.0 Te | 35.0 Te |  |  |
|  | 25.1 Tl | 17.7 Tl |  |  |
| 4 | 25.0 Al |  | Did not form a homogeneous glass |  |
|  | 50.0 Se |  |  |  |
|  | 25.0 Cu |  |  |  |
| 5 | 25.0 Ga | 25.1 Ga | GaSe$_{2.1}$Cu$_{1.0}$ |  |
|  | 50.0 Se | 50.8 Se | Did not form a |  |
|  | 25.0 Cu | 24.1 Cu | homogeneous glass |  |
| 6 | 25.1 As | 24.8 As | AsSe$_{1.9}$Cu$_{1.1}$ | 100–600 |
|  | 50.1 Se | 47.3 Se |  |  |
|  | 24.8 Cu | 27.9 Cu |  |  |
| 7 | 45.2 As | 45.1 As | AsSe$_{1.0}$Cu$_{0.2}$ | 10–20 |
|  | 45.5 Se | 45.6 Se |  |  |
|  | 9.3 Cu | 9.3 Cu |  |  |
| 8 | 12.5 As | 9.3 As | AsSe$_5$Cu$_5$ |  |
|  | 50.0 Se | 46.3 Se | Did not form a |  |
|  | 37.5 Cu | 44.4 Cu | homogeneous glass |  |
| 9 | 32.0 As | 31.9 As | AsSe$_2$Cu$_{0.2}$ | 2–4* |
|  | 62.0 Se | 62.0 Se |  |  |
|  | 6.0 Cu | 6.1 Cu |  |  |
| 10 | 33.0 As | 33.2 As | AsSe$_{1.2}$Cu$_{0.82}$ | $\sim$60* |
|  | 40.0 Se | 39.7 Se |  |  |
|  | 27.0 Cu | 27.1 Cu |  |  |
| 11 | 42.0 As | 41.8 As | AsSe$_{1.2}$Cu$_{0.2}$ | 2–4* |
|  | 50.0 Se | 50.2 Se |  |  |
|  | 8.0 Cu | 8.0 Cu |  |  |
| 12 | 27.5 As | 26.5 As | AsSe$_2$Cu | 20–40* |
|  | 48.3 Se | 48.3 Se |  |  |
|  | 24.1 Cu | 25.2 Cu |  |  |

*Measured at a wavelength of 500 nm.

As can be observed from Table I, some of the As-Se-Cu ternaries exhibited unusually large light sensitive photopotentials. That factor and the recognized low and adjustable electrical resistivities of such glass compositions prompted further investigation thereof.

FIG. 1 graphically depicts the observed variations in 100 $\phi_{oc}$ (expressed as mV) with As-Se-Cu stoichiometry, along with the composition region thereof wherein glasses can be formed. As can be seen, the larger values of $\phi_{oc}$ cluster near the AsSe$_2$Cu stoichiometry, thereby suggesting its significance as a photoactive site. The triangles represent compositions which crystallized upon cooling rather than forming glasses.

Figure 2:
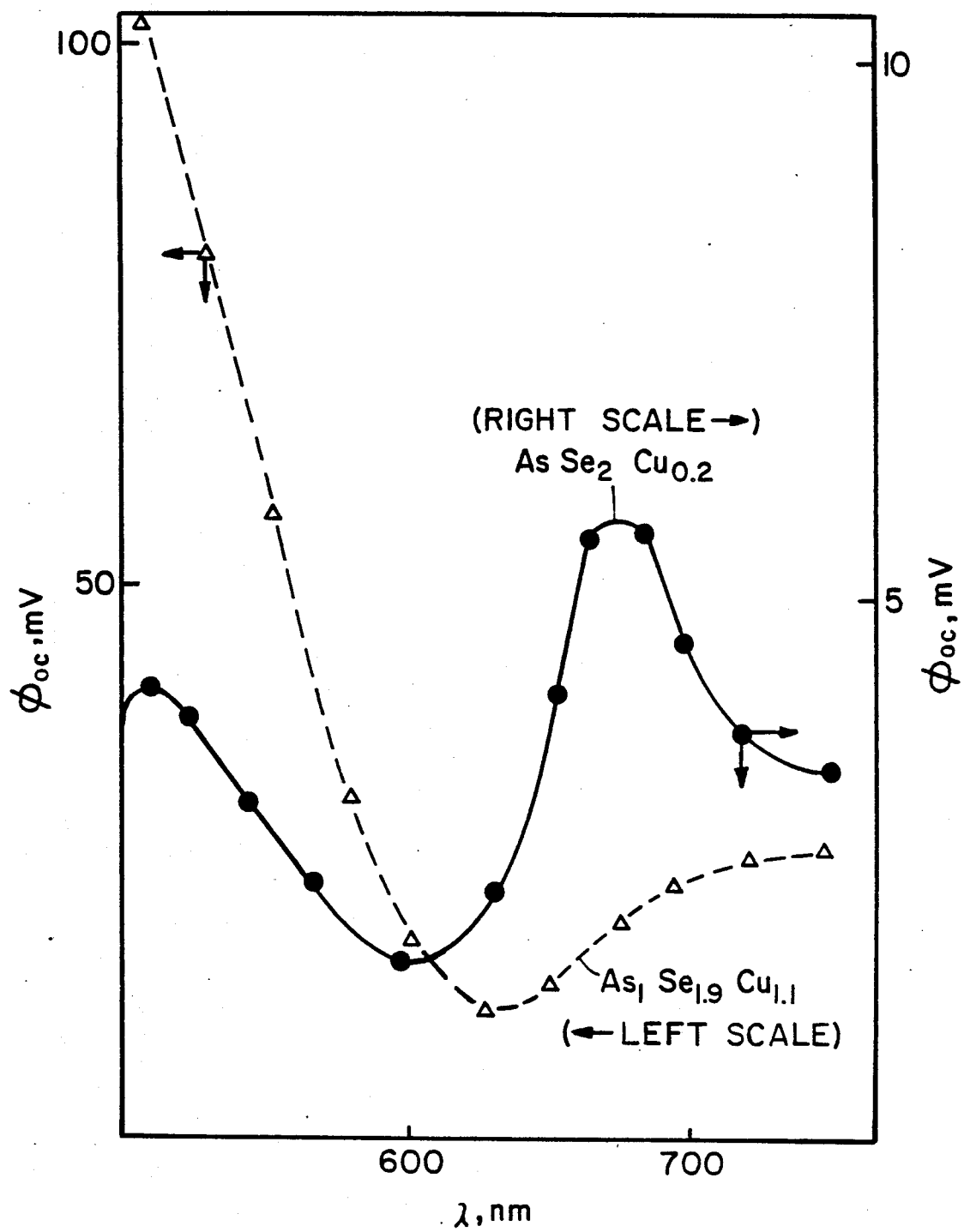
FIG. 2 pictures the wide differences in $\phi_{oc}$ exhibited by glasses within the As-Se-Cu ternary as a function of radiation wavelength utilized.

FIG. 2 graphically illustrates the wide differences in $\phi_{oc}$ demonstrated by glasses within the As-Se-Cu ternary system depending upon the radiation wavelength employed. In like manner to FIG. 1, FIG. 2 makes clear that the photoelectrochemical response of the As-Se-Cu system can be varied substantially through changes in composition.

Figure 3:
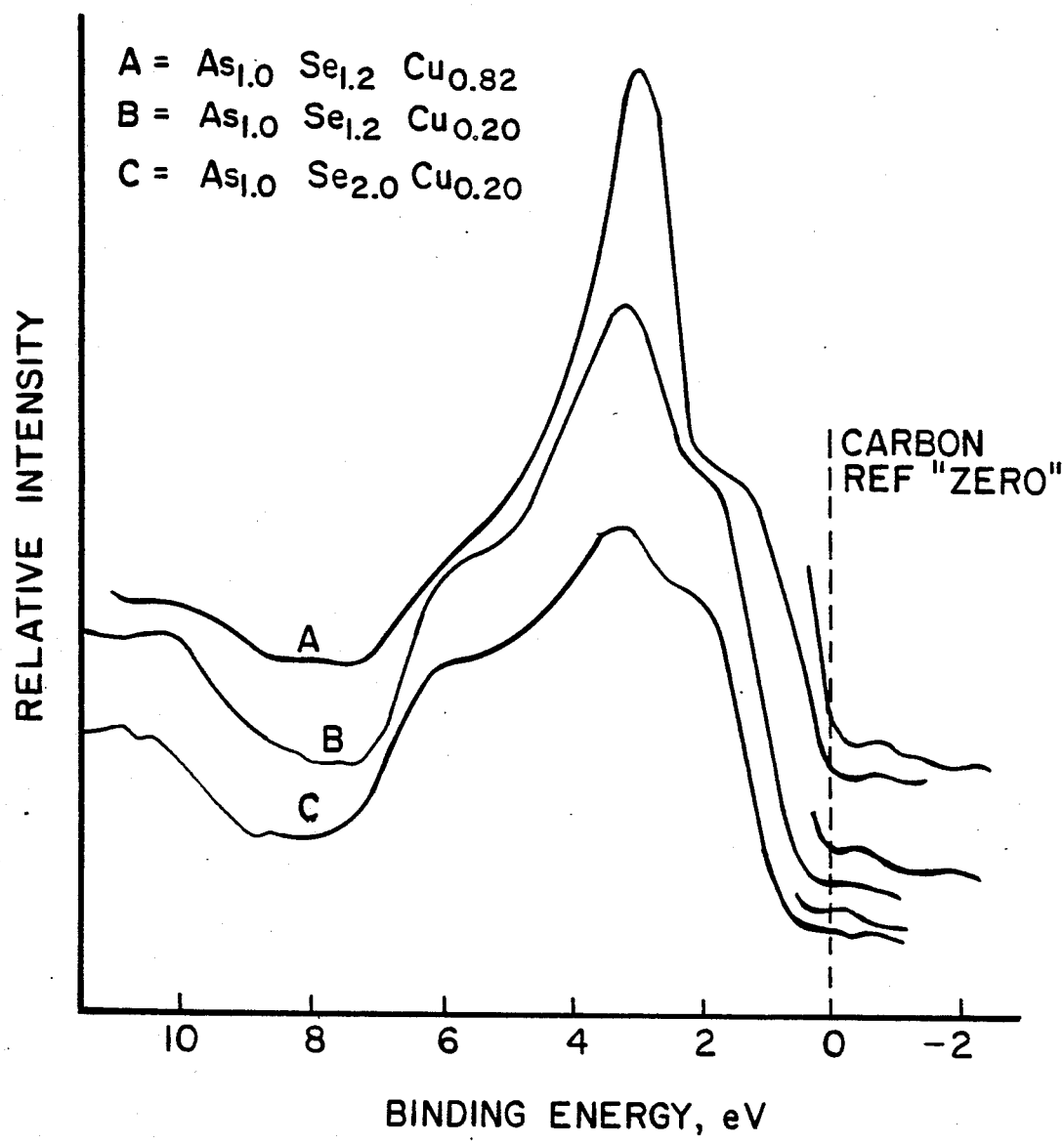
FIG. 3 graphically reports the defined structure of the valence band with changes in composition employing ESCA techniques.

FIG. 3 reports the defined structure of the valence band with varying compositions, as derived from electron spectroscopy chemical analysis (ESCA). The observed shifts in edge position and electronic density can be correlated directly to changes in stoichiometry. ESCA studies have also provided some evidence suggesting the presence of gap states and their variation with composition. FIG. 3 commends the inference that there is a direct connection between stoichiometry, electronic band structure, and output photoresponses in the As-Se-Cu system. In any event, the ESCA analyses exhibit the control of properties offered by glass composition.

Figure 4:
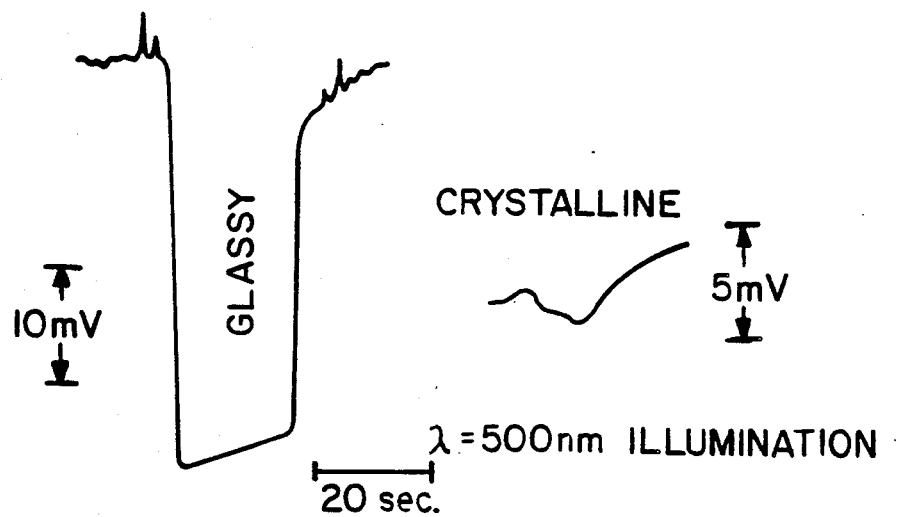
FIG. 4 graphically illustrates open circuit photosignals manifested by the vitreous and crystalline form of $AsSe_2Cu$.
Figure 5:
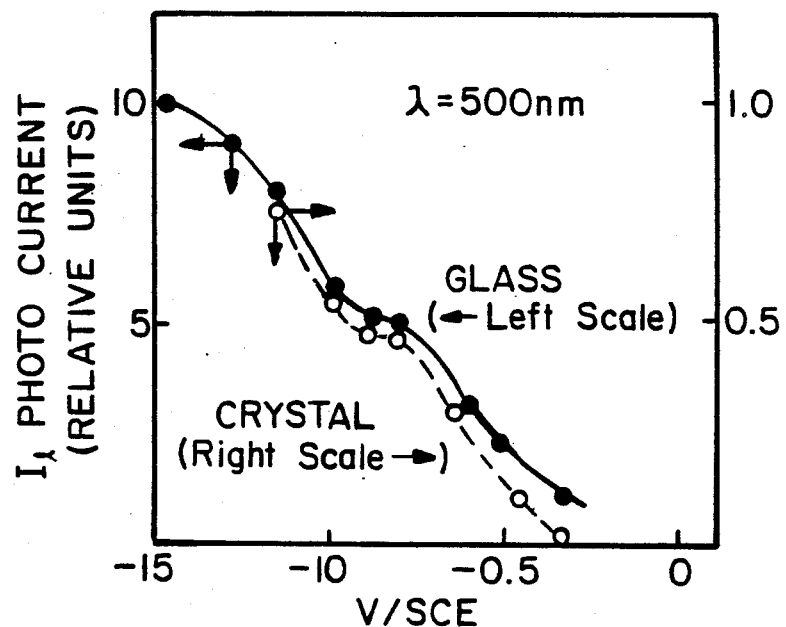
FIG. 5 records closed circuit photosignals exhibited by the vitreous and crystallized forms of 25AS:50Se:25Cu.

FIGS. 4 and 5 compare the open and closed circuit photosignals demonstrated by the vitreous and crystallized forms of 25As:50Se:25Cu. Although the electrical resistivity of the glass is about 10$^4$ times greater than the crystallized phase, both the $\phi_{oc}$ and photocurrent (I$_1$) of the glass are about 10 times greater than the crystalline form. In both FIGURES a relatively weak illumination at a wavelength of 500 nm was utilized. Such enhancement demonstrates that a glassy surface can surpass a crystalline analog in photoconversion efficiency. This effect has been tested only rarely in the past, notably for silicon. In FIG. 5 the voltage values are reported vis-a-vis a standard calomel electrode (SCE).

Figure 6:
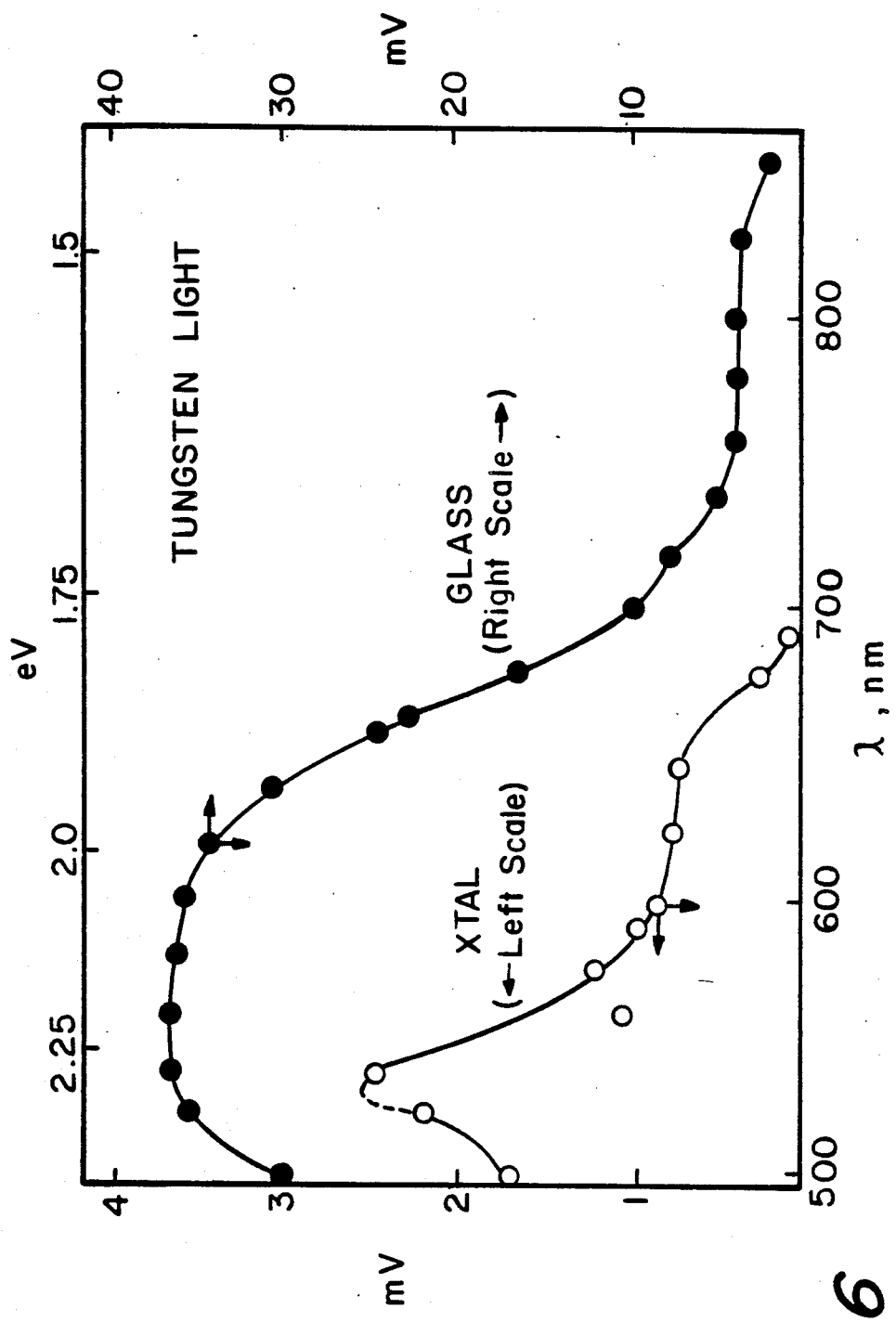
FIG. 6 provides a comparison of open circuit photopotentials of amorphous and crystallized 25As:50Se:25Cu.

The comparison of open circuit photopotentials of the glass 25As:50Se:25Cu with those of the crystallized phase in FIG. 6 exhibits a significant red shift in response for the glass. The same source of illumination employed above in FIGS. 4 and 5 was utilized here also.

That shift can be used advantageously in utilizing the solar spectrum in photovoltaic and photoelectrochemical application.

The measurement of $I_1$ vs. V, when an oxidizing or reducing agent is purposefully introduced, provides a basis for estimating the fraction of impinging light energy which is converted into electrical energy. Net conversion occurs if, for a given p-type semiconductor under illumination, reduction of an introduced oxidant commences at a voltage (Vfb) less cathodic (more positive) than at a platinum electrode ($E_{\frac{1}{2}}$). Better conversion corresponds to increasing the difference: $\phi_{oc} = Vfb - E_{\frac{1}{2}}$. Better conversion also occurs when $I_1$ is increased for V between Vfb and $E_{\frac{1}{2}}$. $I_1$ at $V = E_{\frac{1}{2}}$ is termed the short circuit photocurrent ($I_{sc}$). An estimation of the useful energy captured by a semiconductor/solution junction can be made via the product of the short circuit photocurrent and the open circuit photopotential, i.e.:

$$P' = I_{sc} \times \phi_{oc}$$

By defining P as the light power input, solar energy efficiencies can then be estimated by the expression:

$$E \sim 100(P'/P)$$

Figure 7:
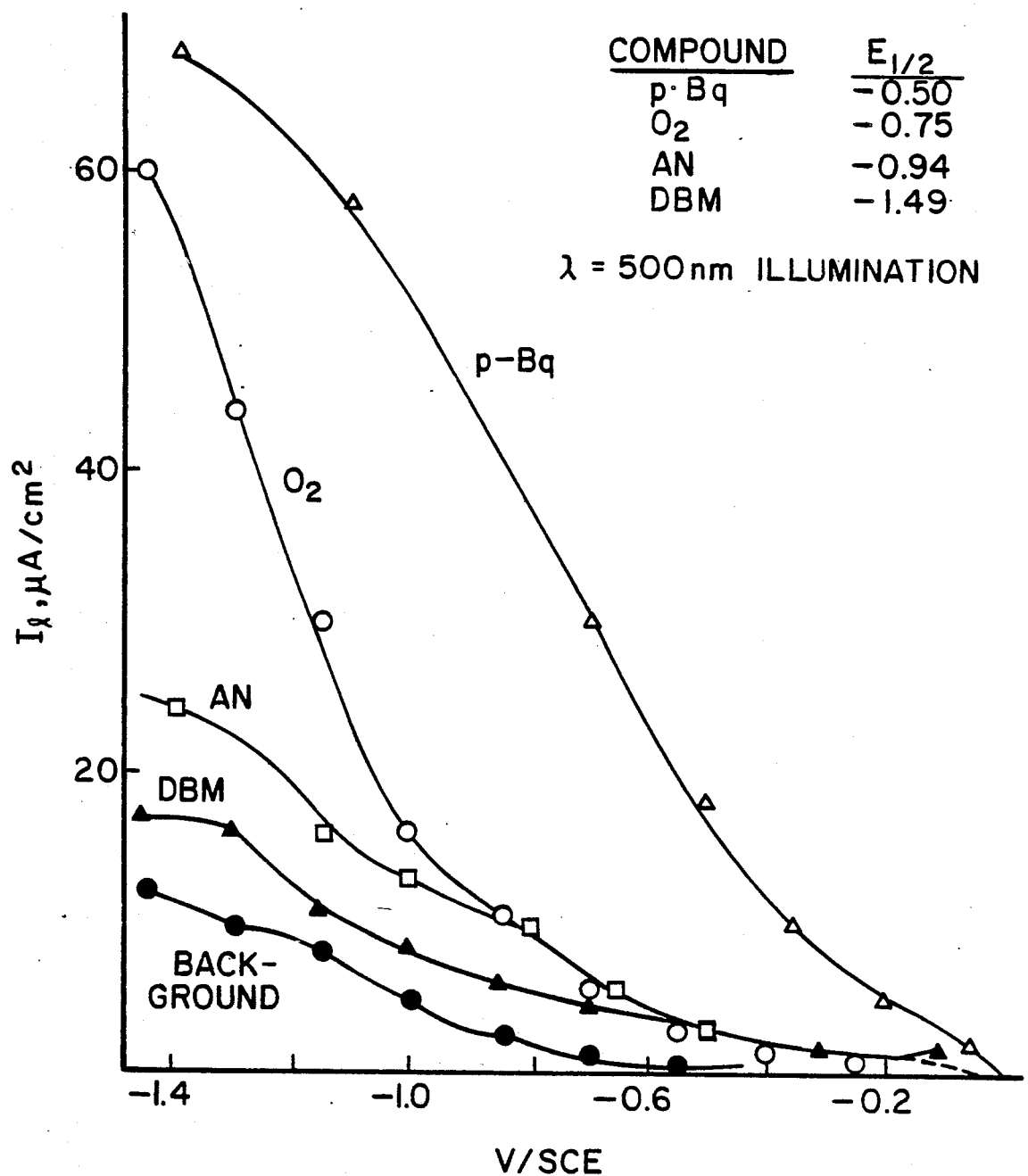
FIG. 7 presents several curves of photocurrents exhibited at various voltages for several redox species.

FIG. 7 presents several plots of $I_1$ versus V with introduced electron acceptors utilizing 500 nm (2.4 eV) light ($\sim 1$ mW/cm$^2$). That potential comfortably exceeds the energy necessary to excite across the gap of any of the inventive glasses. Based upon the foregoing equation, a rough estimate of the conversion efficiency (including a "fill-factor" correction) of the electrode in FIG. 7 is $\sim 0.5\%$. The trend of the curves indicates that the optimized output for a given glass may be attained through the proper choice of oxidant. Similar measurements using p-Si [(100) Texas Instruments Co.] indicate comparable photocurrents, open circuit potentials, and efficiencies at 500 nm. When 1 mM p-benzoquinone was employed, for example, $\phi_{oc} \sim 200$ mV and $I_{sc} \sim 1.5$ $\mu$A/cm$^2$.

FIG. 7 also illustrates a feature common to the inventive vitreous As-Se-Cu electrodes. As can be observed, $I_1$ evidently goes to zero at a voltage (Vfb) which is independent of the $E_{\frac{1}{2}}$ of the introduced oxidant. For the four redox species examined, viz., p-benzoquinone (p-BQ), oxygen, anthraquinone (AN), and dibenzoylmethane (DBM), the values for $\phi_{oc}$ are 0.4, 0.65, 0.85, and 1.4 volts, respectively. Based upon basic "band bending" theory, that behavior would seem to imply an essential absence of surface or bulk defects detrimental to photoelectrochemical performance. Such ideal behavior has been defined in the art as system having "conduction band pinning". In the case of an "unpinned" system, $\phi_{oc}$ will be constant. Because the $\phi_{oc}$ values of the inventive As-Se-Cu glasses do not appear to be constant, the photoelectrochemical output may be tailored by the choice of oxidant. It must be understood, however, that the behavior reported in FIG. 7 cannot be deemed to constitute unequivocal evidence of the phenomenon of pinning.

Figure 8A:
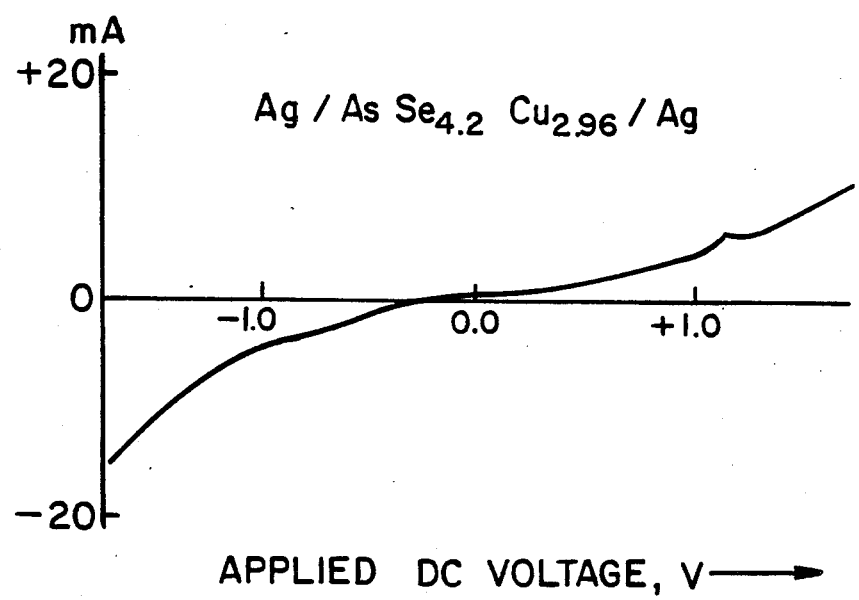
FIGS. 8a and 8b illustrate the rectification of metal-/As-Se-Cu junctions utilizing current-voltage plots.
Figure 8B:
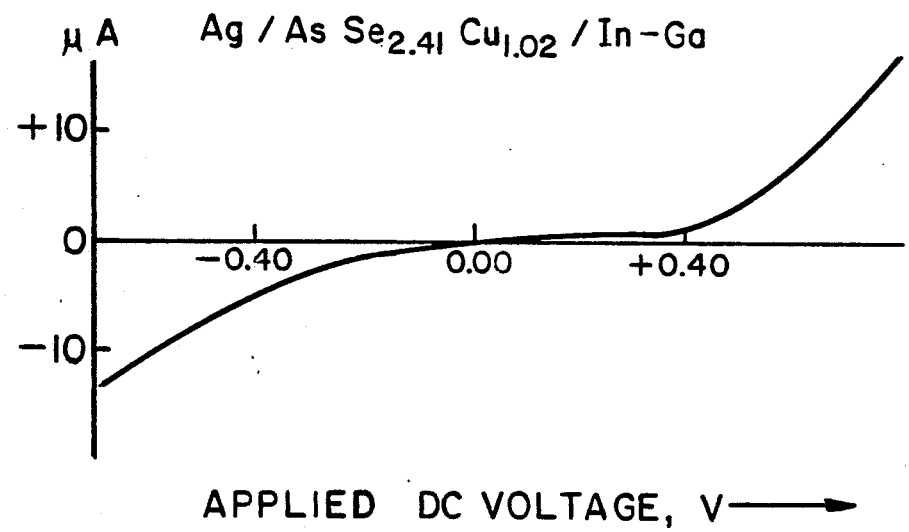

The observed rectification of metal/As-Se-Cu junctions, as exemplified in FIGS. 8 and 9, recommends the application of the inventive glasses for solid state electronic components such as diodes and photodiodes. With either a Ag or Ir-Ga contact, blocking character is apparent from the DC current-voltage plot in FIGS. 8a and 8b.

FIG. 8a is such a plot for Ag/AsSe$_{4.2}$Cu$_{2.96}$/Ag junction wherein current is expressed in terms of milliamperes and the applied DC voltage in terms of volts. FIG. 8b is a plot for Ag/AsSe$_{2.41}$Cu$_{1.02}$/In-Ga junctions wherein current is expressed in terms of microamperes and the applied DC voltage in terms of volts.

Figure 9B:
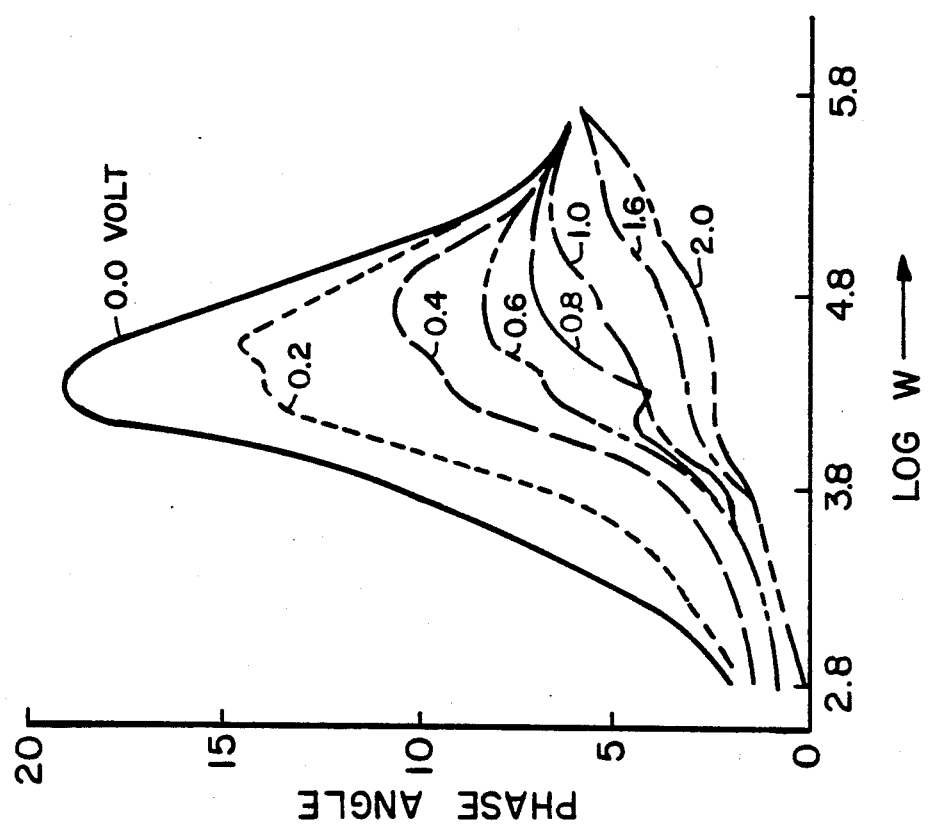
FIGS. 9a and 9b comprise Bode plots of a metal/As-Se-Cu junction in terms of applied voltage.
Figure 9A:
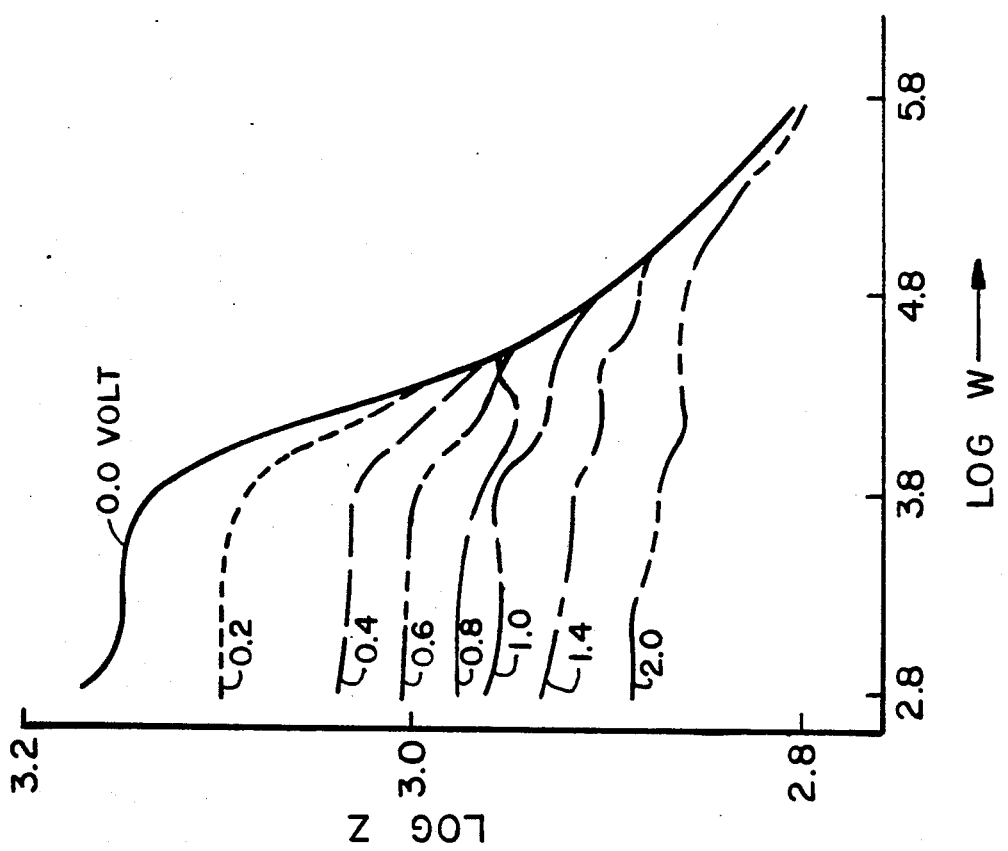

The presence of at least one capacitive element is confirmed by the phase angle and impedance (Z) variation with AC frequency ($\omega$) evidenced during impedance measurements. Impedance is expressed in terms of ohms and frequency in terms of radians/second. FIGS. 9a and 9b comprise Bode plots for In-Ga/AsSe$_{2.4}$Cu$_{1.02}$/In-Ga junction versus applied voltage.

In contrast, Au exhibits ohmic behavior, i.e., the phase angle is essentially 0° at all frequencies and Z is invariant.

In like manner to the variation of photoelectrochemical behavior exhibited with redox couple, the choice of contacting metal enables the junction character of As-Se-Cu glasses to be adjusted.

Based upon the above results, it has been determined that As-Se-Cu compositions operable in the present invention are encompassed within the general area ABCDE of FIG. 1, with the preferred compositions filling within the region BCF. In approximate atomic percent, Point A represents about 20% As, 25% Se, and 5% Cu, Point B designates about 25% As, 60% Se, and 15% Cu, Point C signifies about 30% As, 39% Se, and 31% Cu, Point D indicates about 28% As, 37% Se, and 35% Cu, Point E records about 48% As, 47% Se, and 5% Cu, and Point F delineates about 38% As, 47% Se, and 15% Cu.

Chalcogenide glasses containing As, Se, and Cu are not novel per se. For example, U.S. Pat. No. 3,772,006 discloses glasses consisting essentially, expressed in terms of atomic percent, of 28–55% As, 30–63% Se, 3–12% Cu, and 2–6% Au. The glasses are asserted to exhibit a memory effect; i.e., the electrical resistivity thereof can be electrically switched from a high resistance state to a low resistance state, and the latter state is maintained in the absence of any bias current after the switching current has been removed. Another example, U.S. Pat. No. 3,841,739, describes glasses consisting essentially, expressed in terms of atomic percent, of 25–60% As, 25–60% Se, and 12–40% Cu. The glasses are stated to transmit infrared radiations at 12.8 and 16 microns and up to a transmitting edge of 20 microns.

In summary, the thrust of the instant invention is the application of a specific range of glass compositions within the As-Se-Cu system as photoelectrodes in photoelectrochemical cell devices. Those glass compositions provide for solar conversion at a glass/electrolyte interface. The unusual sensitivity of the glass compositions to visible light and the clear tracking of their photoelectrochemical properties with the changes in composition have nowhere been previously recognized.

And, as has been explained above, the facility with which compositions of the inventive glasses can be varied endows them with exceptional capabilities. For example, the glasses can form solid state metal/glass junctions with rectifying properties which, in like manner to the above glass/electrolyte junctions, can be adjusted through composition.

Also, because a continuous range of As-Se-Cu glasses exhibits photoactivity in varying degrees, graded junctions composed of thin laminae of different glass compositions can be prepared which can be perceived as yielding higher conversion efficiencies than single gap junctions.

For example, under typical incident solar radiation, a laminate composed of semiconductors with bandgaps of 1.0 and 1.4 eV can, in principle, attain efficiencies near 40% ]J. R. Bolton, *Science*, 202, 705 (1978)]. A laminate exhibiting bandgaps approximating those values can be fabricated from the compositions 25As:50Se:25Cu and 27.7As:55.4Se:16.9Cu. Furthermore, glasses with a fixed Se/As of 2.0 and Cu contents intermediate to the above have effective bandgaps between 1.0 and 1.4 eV.

In summary, the thrust of the instant invention is the application of a specific range of glass compositions within the As-Se-Cu system in photoelectrochemical devices. Those glass compositions provide for solar conversion at a glass/electrolyte interface. The unusual sensitivity of the glass compositions to visible light and the clear tracking of their photoelectrochemical properties with the changes in composition have nowhere been previously recognized.

And, as has been explained above, the facility with which compositions of the inventive glasses can be varied endows them with exceptional capabilities. For example, the glasses can form solid state metal/glass junctions with rectifying properties which, in like manner to the above glass/electrolyte junctions, can be adjusted through composition.

Also, because a continuous range of As-Se-Cu glasses exhibits photoactivity in varying degrees, graded junctions composed of thin laminae of different glass compositions can be prepared which can be perceived as yielding higher conversion efficiencies than single gap junctions.

For example, under typical incident solar radiation, a laminate composed of semiconductors with bandgaps of 1.0 and 1.4 eV can, in principle, attain efficiencies near 40% [J. R. Bolton, *Science*, 202, 705 (1978)]. A laminate exhibiting bandgaps approximating those values can be fabricated from the compositions 25As:50Se:25Cu and 27.7As:55.4Se:16.9Cu. Furthermore, glasses with a fixed Se/As of 2.0 and Cu contents intermediate to the above have effective bandgaps between 1.0 and 1.4 eV. A laminate structure wherein the Cu content is continuously varied in such a composition range can yield efficiencies well in excess of 50%. The maximum theoretical efficiency for a single junction device is only 30%.

I claim:

1. In a photoelectrochemical cell device consisting essentially of:
   (a) an electrolyte containing appropriately chosen redox couples in contact with
   (b) a working electrode, voltage-biased with respect to
   (c) a convenient reference electrode and in series with
   (d) a photoelectrode, the improvement comprising said photoelectrode being composed of a glass exhibiting a bandgap of about 0.8–2.5 eV, an electrical resistivity less than about $10^6$ ohm-cm, and an open-circuit photopotential of about 50–500 millivolts under white light, as exemplified by illumination from a 150 watt Xenon lamp, and consisting essentially of an As-Se-Cu composition within area ABCDEA of FIG. 1.

2. In a solid state electronic component consisting essentially of a metal/glass junction with rectifying properties, the improvement comprising said glass being composed essentially of an As-Se-Cu composition within the area ABCDEA of FIG. 1.

3. A photoelectrochemical cell device according to claim 1 wherein said photoelectrode is composed of a glass which exhibits a bandgap in the vicinity of 1.0 eV.

4. A photoelectrochemical cell device according to claim 1 wherein said photoelectrode is composed of a glass having a composition which lies within area BCFB of FIG. 1.

5. A solid state electronic component according to claim 2 wherein said glass consists essentially of a composition within the area BCFB of FIG. 1.

6. A solid state electronic component according to claim 2 selected from the group consisting of a diode and a photodiode.

* * * * *